United States Patent [19]

Williams

[11] Patent Number: 5,778,269
[45] Date of Patent: Jul. 7, 1998

[54] CAMERA AND ADVANCE-REWIND UNIT

[75] Inventor: Patricia L. Williams, Rochester, N.Y.

[73] Assignee: Eastman Kodak Company, Rochester, N.Y.

[21] Appl. No.: 874,901

[22] Filed: Jun. 13, 1997

[51] Int. Cl.[6] ............................................. G03B 1/00
[52] U.S. Cl. ...................... 396/387; 396/411; 396/413
[58] Field of Search ........................... 396/387, 395, 396/390, 401, 411, 413

[56] References Cited

U.S. PATENT DOCUMENTS

| | | | |
|---|---|---|---|
| 1,921,559 | 8/1933 | Case | 396/411 |
| 2,140,445 | 12/1938 | Mihalyi | 396/413 |
| 2,168,998 | 8/1939 | Lindenberg | 242/350 |
| 2,674,931 | 4/1954 | Mihalyi | 396/396 |
| 2,704,969 | 3/1955 | Mische | 396/411 |
| 2,912,181 | 11/1959 | Suzukawa | 242/350 |
| 3,097,809 | 7/1963 | Gunther | 242/350 |
| 3,399,843 | 9/1968 | Nerwin | 242/350 |
| 3,423,041 | 1/1969 | Steisslinger | 396/413 |
| 3,479,940 | 11/1969 | Nerwin | 396/413 |
| 3,868,710 | 2/1975 | VanOsch | 396/396 |
| 4,548,304 | 10/1985 | Nagata | 396/387 |
| 5,189,453 | 2/1993 | Boyd | 396/317 |
| 5,453,808 | 9/1995 | Zawodny et al. | 396/387 |
| 5,568,214 | 10/1996 | Stiehler | 396/411 |
| 5,640,637 | 6/1997 | Stephenson, III | 396/411 |

*Primary Examiner*—Eddie C. Lee
*Attorney, Agent, or Firm*—Robert Luke Walker

[57] ABSTRACT

A camera for use with photographic film and advance-rewind unit. The camera has a body that defines a film path and a film drive disposed in operative relation to the film path. The advance-rewind is mounted on the body. The advance-rewind has a crank and film winder that define a common winding axis. The crank engages the film drive. The crank is rotatable about the winding axis in opposed first and second directions of rotation relative to the body. The film winder is pivotable about the winding axis in the first and second directions. The crank has a base and a handle. The film winder has a grip portion. The advance-rewind has a one-way, overrunning clutch disposed between the crank and the film winder. The clutch is switchable between active and released states. In the active state, the clutch couples the film winder to the crank during rotation of the film winder relative to the body in the first direction of rotation; decouples the film winder from the crank during rotation of the crank relative to the film winder and the body in the first direction of rotation; and precludes rotation of the crank relative to the body in the second direction of rotation. The clutch, in the released state, permits rotation of the crank relative to the body in the second direction of rotation.

20 Claims, 8 Drawing Sheets

CAMERA AND ADVANCE-REWIND UNIT

CROSS-REFERENCE TO RELATED APPLICATIONS

Reference is made to commonly assigned co-pending U.S. patent application Ser. No. 08/874,841, filed Jun. 13, 1997 entitled: CAMERA AND METHOD FOR TRANSPORTING FILM IN A CAMERA, and filed in the names of Robert Stanchus and Timothy Fuss.

FIELD OF THE INVENTION

The invention relates to still photographic film cameras and to film advance and rewind mechanisms for such cameras. The invention more particularly relates to an advance-rewind unit and to a camera including such a subunit.

BACKGROUND OF THE INVENTION

In many still photographic film cameras, film is loaded as a scroll within a canister or magazine. The film is advanced from one chamber to another within the camera and is later rewound back into the magazine. Film exposure is provided either on film advance or on rewind. The commonest film of this type has been 135 format (also called "35 mm"). A newer film of this general type is Advanced Photo System™ format film (APS™ film) such as Advantix™ films marketed by Eastman Kodak Company, of Rochester, N.Y.

The APS film magazine is smaller than a 135 film magazine. This reflects a continuing trend toward smaller full-featured cameras. Such cameras can be problematic with controls and user accessible features crowded together into the smaller available space. The small available space is particularly troublesome for a film advance lever or thumbwheel, since it is highly preferred that a person be able to advance the film without moving one or both hands from a position suitable for holding the camera while shooting film. Similarly, small available space may interfere with a users ability to both grip and rotate a rewind knob without running into other camera components. It is thus desirable that a camera and advance-rewind unit be provided that reduces the space necessary for manual operation of film advance and rewind, but provides ease of use.

U.S. Pat. No. 1,921,559 discloses a camera in which a knob attached to a spool in a film magazine is turned one direction to thrust film into an empty chamber and is turned in another direction to rewind the film into the magazine. U.S. Pat. No. 3,868,710 discloses a similar camera in which both the film magazine and the supply chamber lack spools.

U.S. Pat. No. 2,674,931 discloses a camera in which a knob connected to a film spool is moved to one axial position to prewind a roll of film into an empty chamber. The shaft is then moved to another axial position to engage a one-way clutch that, in association with a metering mechanism, only permits the knob to turn in the opposite direction, winding the film.

U.S. Pat. No. 2,704,969 discloses a camera in which an objective/range finder knob is coaxial with a film winding knob. The objective/range finder knob pivots about an arc within a fixed mount concentric with the larger film winding knob.

U.S. Pat. No. 3,423,041 discloses a camera in which a single operating lever (moved in one direction of rotation) advances and rewinds film. A two position drive mechanism is switched to change the direction of rotation.

U.S. Pat. No. 3,399,843 discloses a camera in which a shaft is movable between a first position engaging a take-up spool for winding film from a magazine and a second position engaging a gear train connected to the magazine spool for rewinding back into the magazine. The same knob is used in both cases. Engagement and disengagement of the take-up spool is provided by a positive clutch. Engagement and disengagement of the gear train is provided by movement of a gear fixed to the shaft. A ratchet and pawl mechanism limits movement of the shaft to a single direction of rotation. U.S. Pat. No. 3,479,940 discloses a similar camera providing automatic film advancing and rewinding.

U.S. Pat. No. 2,140,445 discloses a camera having film advance and rewinding clutches, which are connected to respective film spools and separate film winding and rewinding mechanisms, alternately by a pivoting lever. The rewinding mechanism has a knob that rotates in axial alignment with one of the film spools. The film winding mechanism has a film advance lever which rotates about an axis disposed at 90 degrees to the axes of film chambers.

U.S. Pat. No. 5,568,214 discloses a camera having a clutch between a take-up spool and a drive gear.

U.S. Pat. No. 2,168,998 discloses a camera having a film-winding mechanism including a ratchet and pawl. A winding knob is rotated to advance the film. The pawl can be moved out of engagement with the ratchet for rewinding using a separate rewinding knob. U.S. Pat. No. 1,317,034 and Great Britain Patent No. 499,544 also disclose cameras having film winding mechanisms having ratchets and pawls.

U.S. Pat. No. 4,522,477 discloses a camera having a motorized winder/rewinder having separate coaxial one-way clutches for film advancing and rewinding. A manual wind lever is also coaxial and includes an additional one-way clutch.

U.S. Pat. No. 4,548,304 discloses a one-way over-running clutch and a camera having a pair of such clutches, arranged to operate in opposite directions of rotation, for film advancing and rewinding using a reversible motor.

SUMMARY OF THE INVENTION

The invention is defined by the claims. The invention, in its broader aspects, provides a camera for use with photographic film and an advance-rewind unit. The camera has a body that defines a film path and a film drive disposed in operative relation to the film path. The advance-rewind is mounted on the body. The advance-rewind has a crank and film winder that define a common winding axis. The crank engages the film drive. The crank is rotatable about the winding axis in opposed first and second directions of rotation relative to the body. The film winder is pivotable about the winding axis in the first and second directions. The crank has a base and a handle. The film winder has a grip portion. The advance-rewind has a one-way, overrunning clutch disposed between the crank and the film winder. The clutch is switchable between active and released states. In the active state, the clutch couples the film winder to the crank during rotation of the film winder relative to the body in the first direction of rotation; decouples the film winder from the crank during rotation of the crank relative to the film winder and the body in the first direction of rotation; and precludes rotation of the crank relative to the body in the second direction of rotation. The clutch, in the released state, permits rotation of the crank relative to the body in the second direction of rotation.

It is an advantageous effect of the invention that a camera and advance-rewind unit are provided that reduce the space necessary for manual operation of film advance and rewind, but provide ease of use.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

Figure 1:
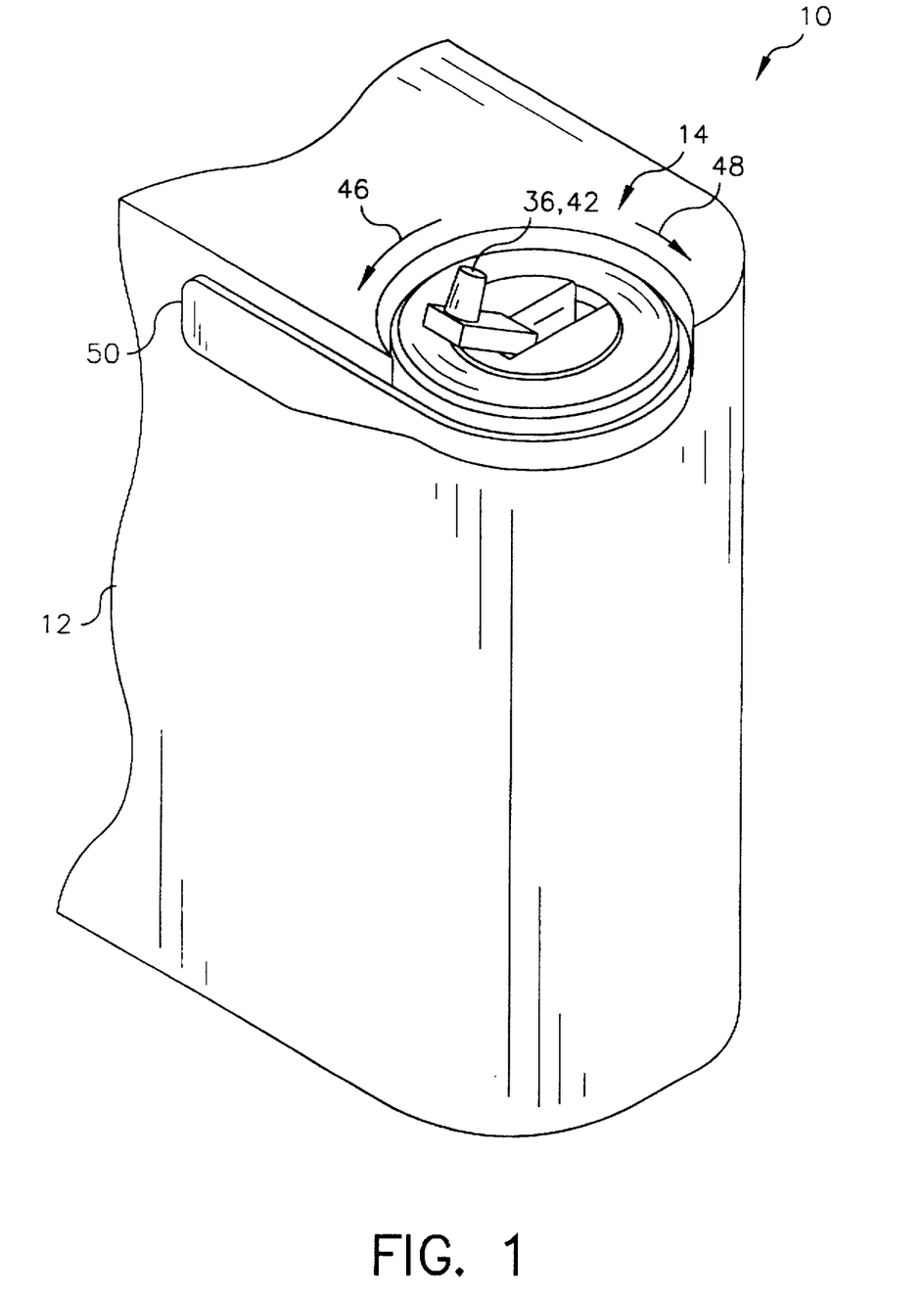
FIG. 1 is a rear partial perspective view of an embodiment of the camera of the invention. In this embodiment, the advance-rewind unit of the invention is horizontal and the film winder is an advance lever.
Figure 8:
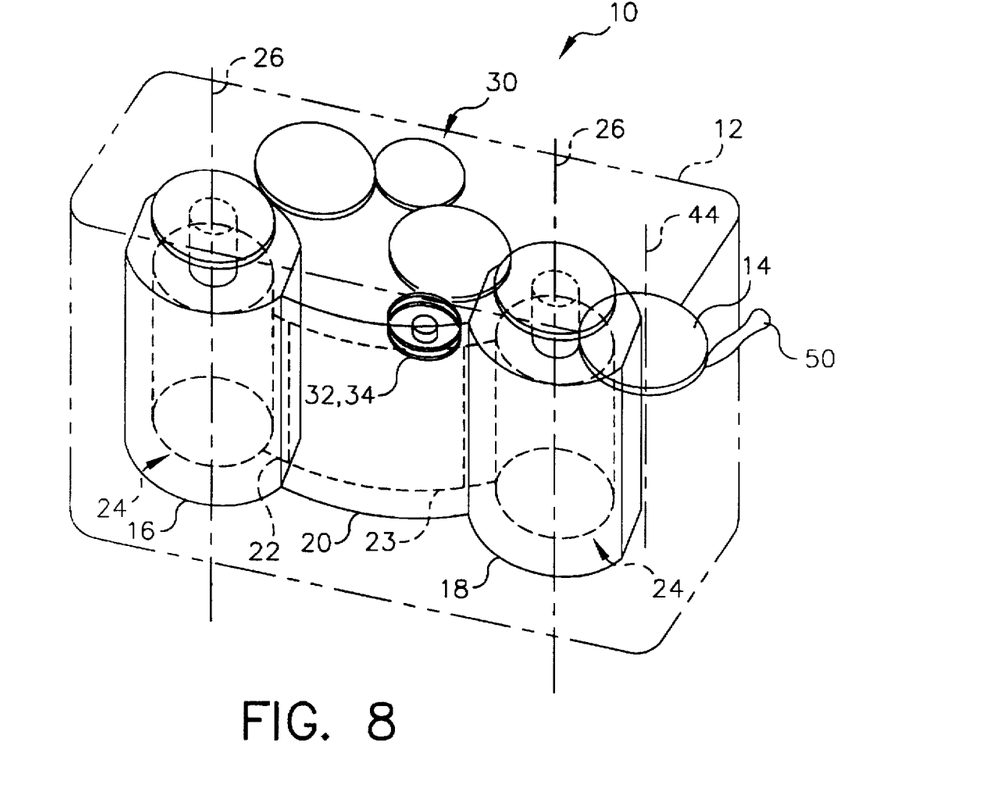
FIG. 8 is a semi-diagrammatical rear perspective view of another embodiment of the camera of the invention.
Figure 9:
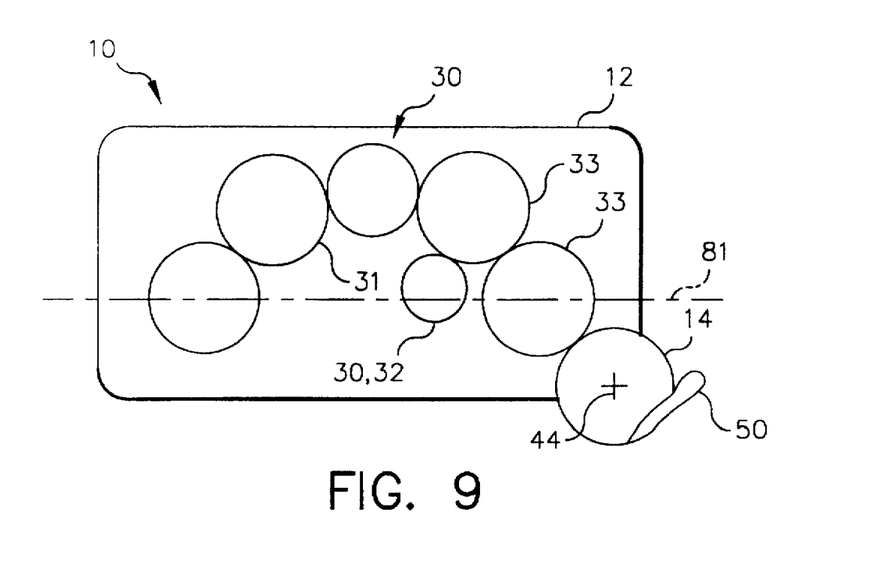
FIG. 9 is a semi-diagrammatical top plan view of the camera of FIG. 8.
Figure 10:
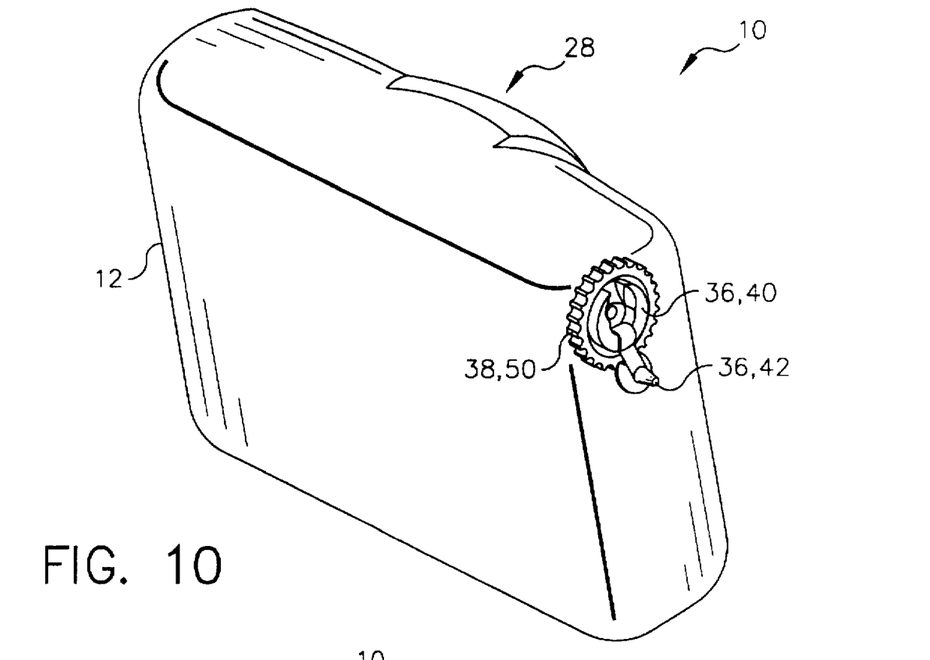
FIG. 10 is a rear perspective view of still another embodiment of the camera of the invention. In this embodiment, the advance-rewind unit of the invention is vertical and the film winder is a thumb wheel.
Figure 11:
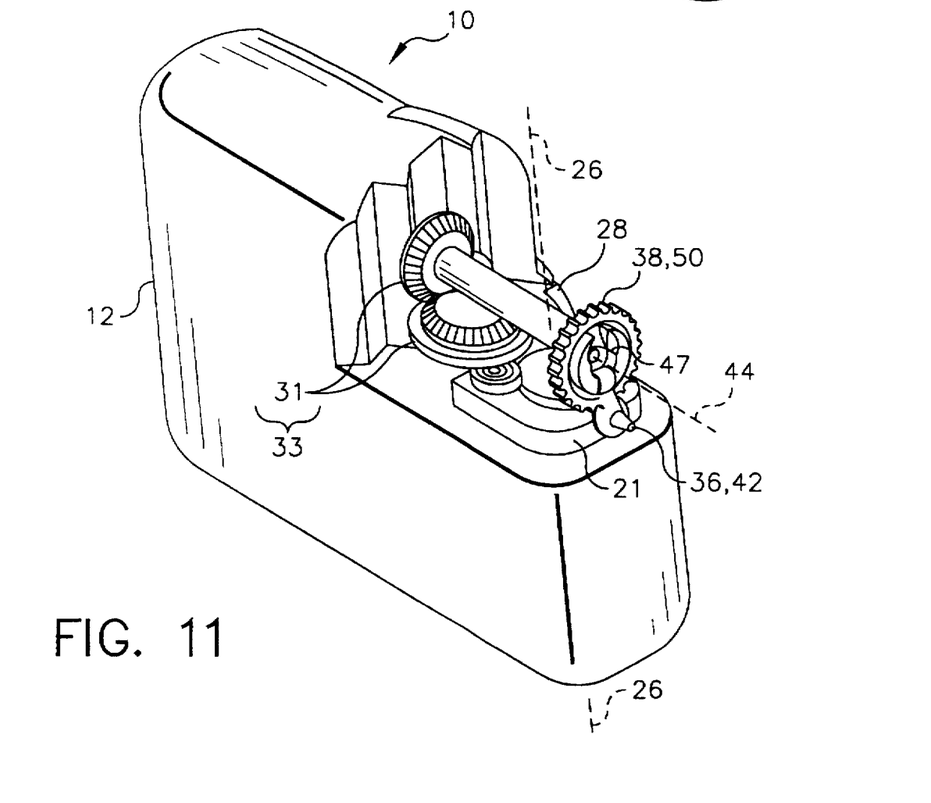
FIG. 11 is a partially cut-away rear perspective view of the camera of FIG. 10 showing the advance-rewind unit, part of the film drive, and a film canister engaged by the film drive.

Referring initially to FIGS. 1 and 8–9, the camera 10 of the invention includes a body 12 and the advance-rewind 14 of the invention. The body 12 defines and encloses a first film chamber or cartridge chamber 16 and a second film chamber or supply chamber 18 and an exposure frame 20 in a light-tight manner. The exposure frame 20 is disposed between the chambers 16,18. The body 12 defines and encloses a film path 22 that includes a film plane 23 aligned with the exposure frame 20 and a substantially cylindrical film space 24 within each of the chambers 16,18. The film spaces 24 each have an axis 26 aligned substantially parallel to the film plane 23. Referring to FIGS. 10–11, a film exposure system 28 selectively directs light to film in the exposure frame 20.

Referring again to FIGS. 8–9, a film drive 30 is disposed in the body 12 in operative relation to the film path 22. Specific details of the film drive 30 can vary. A great many different film drives 30 are well known to those of skill in the art. For example, the film drive 30 can include a gear train or cogbelts and cogwheels, or a combination of such features. Film drives 30 commonly include one or more engagement elements 32 that coact with sprocket holes (not shown) of perforated film. Examples of such elements include rotating sprockets and linearly and/or pivotably movable pawl or sprag mechanisms. Film drives are illustrated in the figures. These illustrations are explanatory, not limiting, and include arrangements of features that are not optimized for particular uses.

Figure 2:
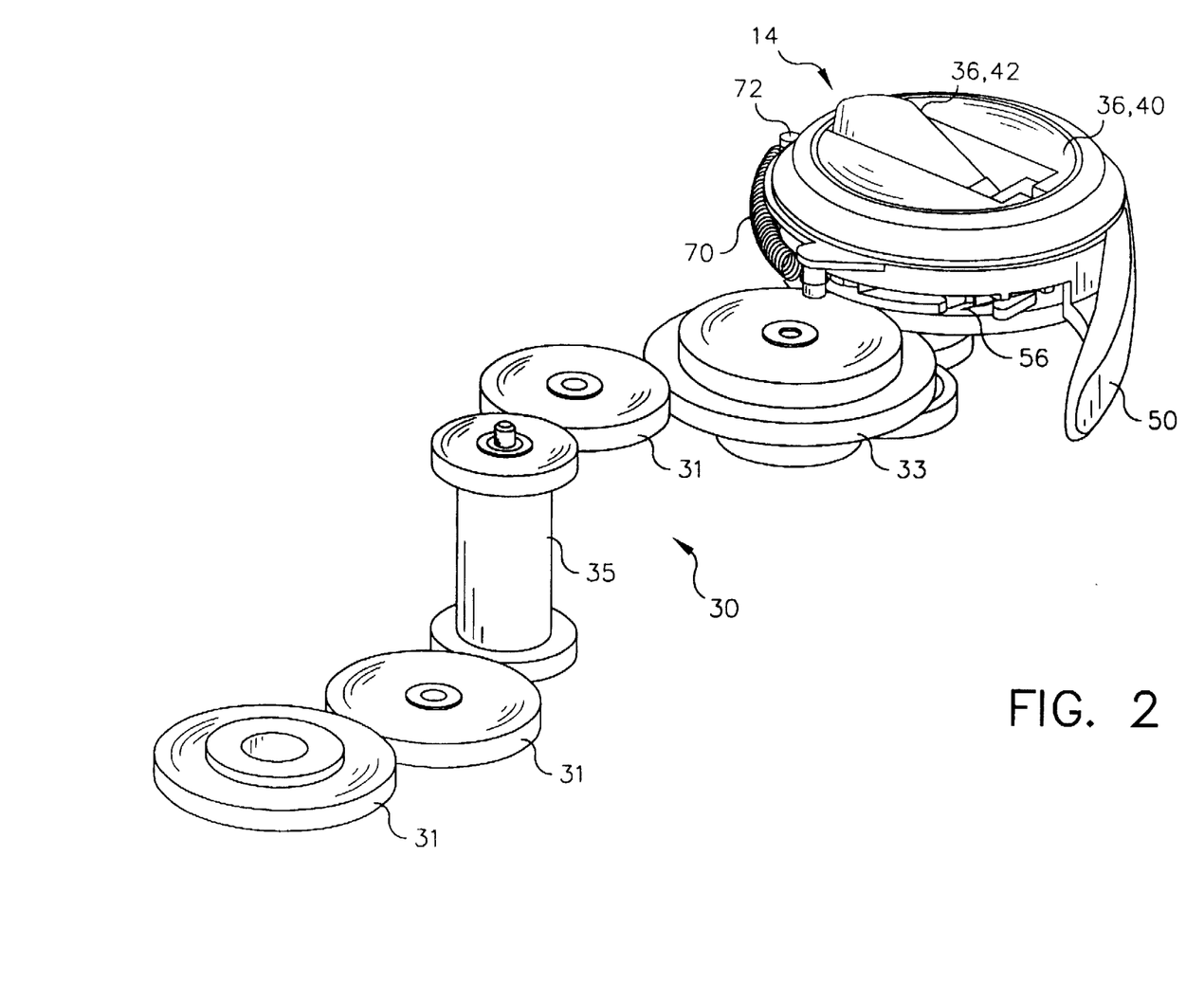
FIG. 2 is a semi-diagrammatical rear perspective view of the advance-rewind unit and film drive of the camera of FIG. 1.
Figure 3:
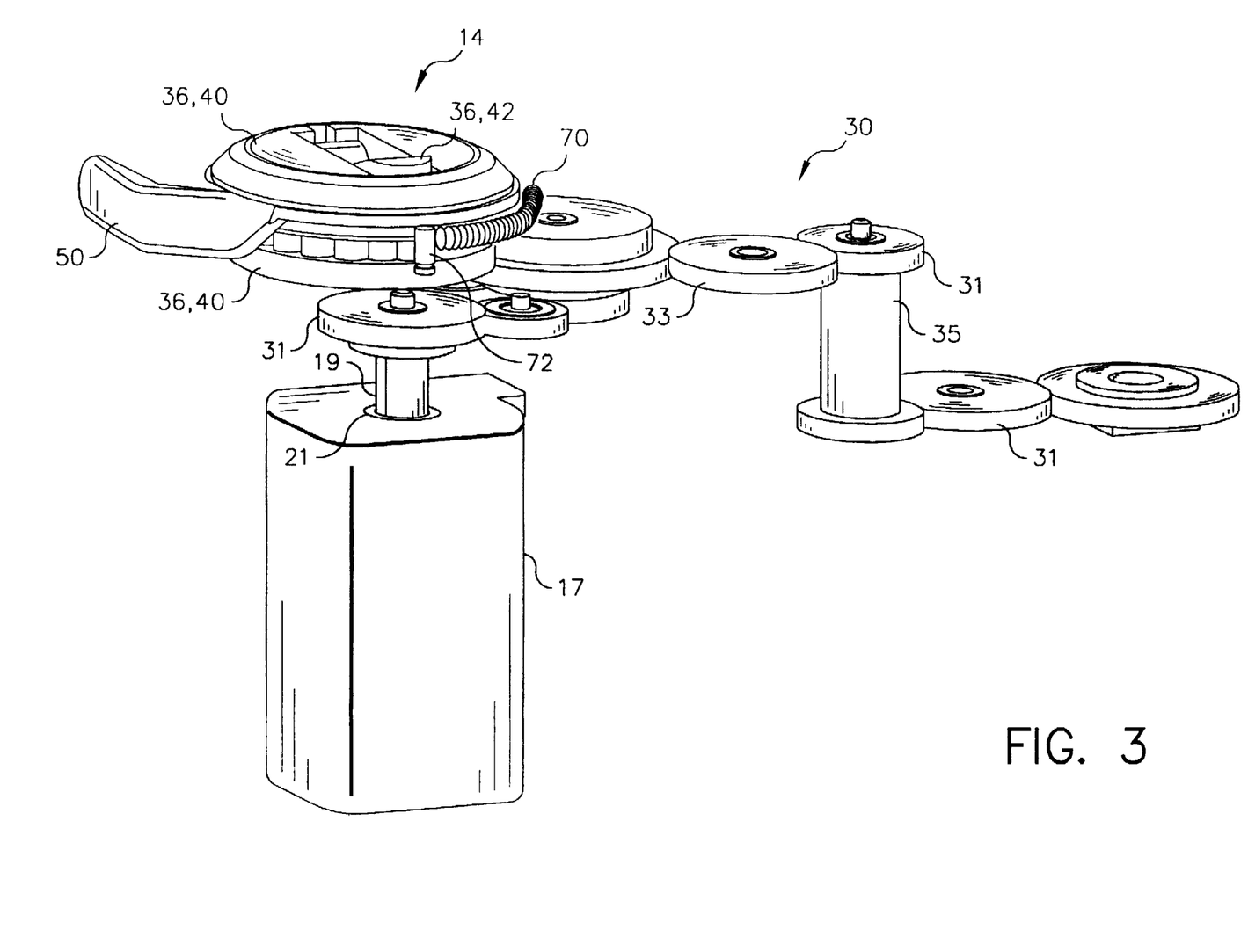
FIG. 3 is a semi-diagrammatical front perspective view of the advance-rewind unit and film drive of FIG. 2. A film magazine is also illustrated operatively connected to the film drive.
Figure 4:
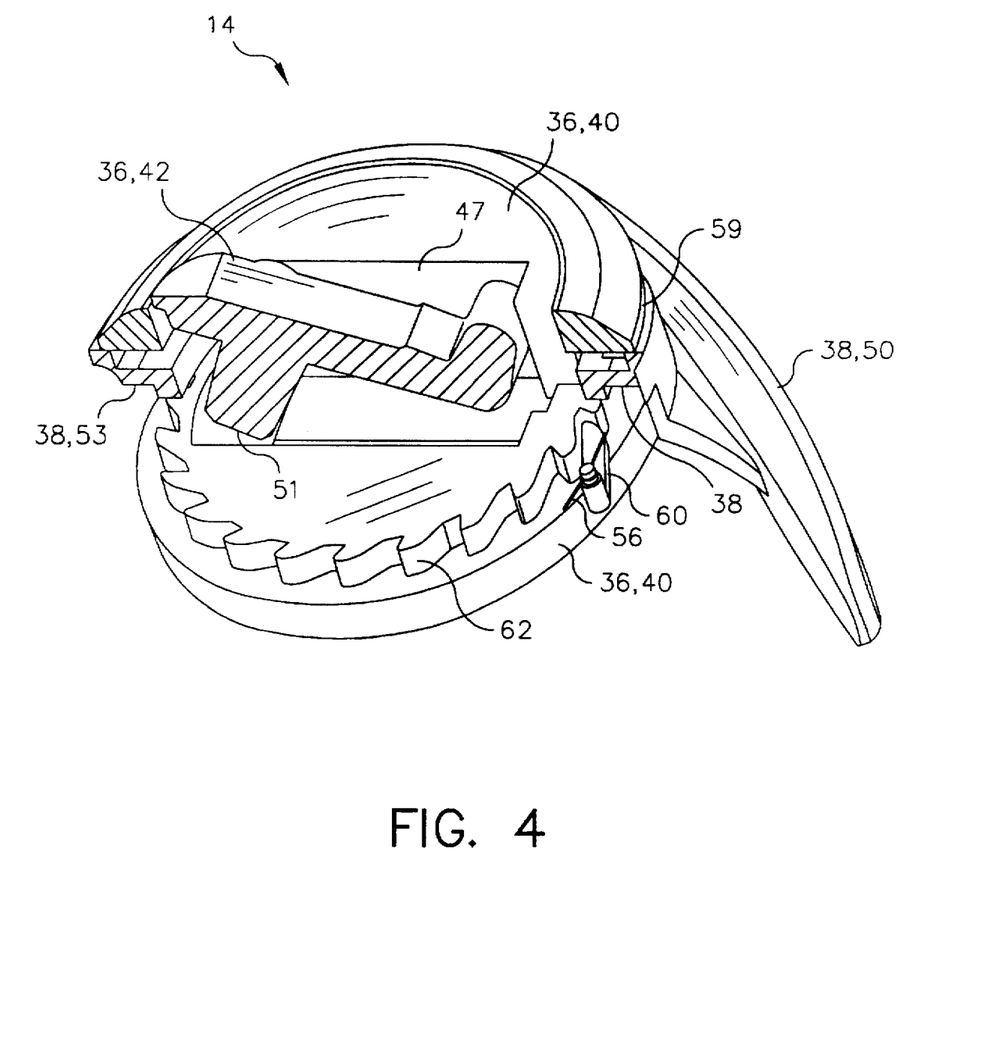
FIG. 4 is a partially cut-away perspective view of the advance-rewind unit of FIG. 1.
Figure 5:
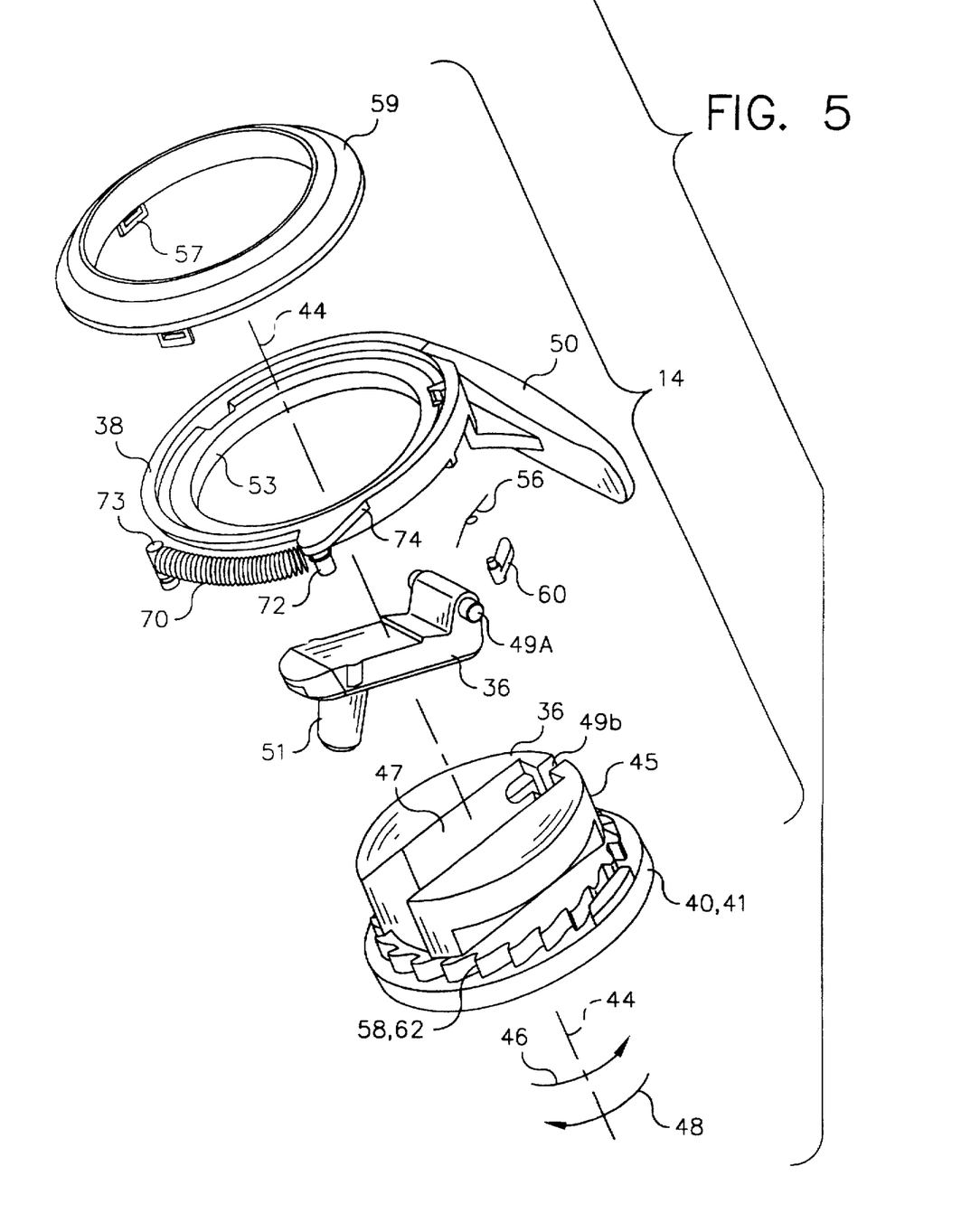
FIG. 5 is an exploded view of the advance-rewind unit of FIG. 1.

Referring now to FIGS. 2–3, the cartridge chamber 16 is configured to receive a cartridge 17. A spline 19 engages the spool 21 of the cartridge 17. The spline 19 is fixed to one of the gears 31 of a gear train 33 of the film drive 30. Another gear 31 is fixed to a spool 35 that is disposed in the supply chamber 18. The film drive 30 includes an engagement-metering element 32 that provides a gear and an adjoining film sprocket on a common shaft (best seen in FIGS. 8–9). The engagement-metering element 32 is part of a metering mechanism that limits film advance to one frame per shutter actuation. The film drive 30 repeatedly meters the film during advancing to hold segments of film in position for exposure in the exposure frame 20. The specifics of the metering mechanism are not critical and many metering mechanisms are well-known to those of skill in the art. Most such film drives 30 meter against the perforations, in other words, the metering mechanism 34 includes an engagement-metering element 32 that grips the perforations to align an unexposed film segment with the exposure frame and restrict further movement until the film is exposed. With some film types, such as APS™ films, the leading portion of the film is not perforated and metering cannot occur until the perforated main portion of the film has been reached. The metering mechanism is not limited to devices having an engagement-metering element meshed with a gear train. In many film drives 30 convenient for use in the camera 10 of the invention, the engagement-metering element is a sprocket that is not driven by a gear, but rather movement of the film itself.

The film drive 30 can include any of a wide variety of additional features (not shown) that add to the convenience of using the camera. The film drive can include an anti-backup (not separately illustrated). The anti-backup can prevent rewinding unless the end of the film is reached or unless a deliberate action is taken by the camera operator. The film drive can include a door lock that precludes access to the film magazine unless the film has been rewound into the magazine and, for example, with APS film, can include a member for opening the film door of the APS magazine. The camera of the invention is generally applicable to photographic films usable in the form of rolled filmstrips and is not limited to a particular photographic film format or type.

The advance-rewind 14 has a first winding element or crank 36 and a second winding element or film winder 38. Each winding element 36,38 is at least partially accessible by the operator from outside the camera body 12. The advance-rewind 14 is described in the following in terms of an embodiment in which the advance-rewind 14 is installed in the camera 10 such that the first direction of rotation advances film and the film is rewound after all film has been advanced and exposed. The advance-rewind is equally applicable to a camera in which film is prewound before exposure and then wound back into the film canister. As a matter of convenience, the term "advancing" and similar terms are used generally herein to refer to film movement in both regular winding and prewinding cameras, in a direction in which the main portion of the film is repeatedly moved one frame at a time for exposure purposes. The term "rewinding" and similar terms are used herein to refer to film movement in a direction in which the main portion of the film is transferred from one film chamber to another, without intervening exposures.

Referring now to FIGS. 2–5, the crank 36 includes a base or gear unit 40 and a handle 42. The gear unit 40 is meshed or in other positive engagement with the film drive 30. The handle 42 is joined to the gear unit 40 and is preferably pivotable relative to the gear unit 40 between a use position (shown in FIG. 1) and stored position (shown in FIG. 2). In the use position, the handle 42 extends outward from the gear unit 40. In the stored position, the handle 42 is at least partially recessed within the gear unit 40. In the embodiment of the invention shown in the figures, the crank has a gear portion 41, and a cap portion 45 above the gear portion 41. The cap portion 45 has a socket 47. The handle 42 is elongate and has a hinge portion 49a, at one end, trapped by and pivotable within a complementary shaped hinge portion 49b of the socket 47. The handle 42 has a knob 51 at the other end. The knob faces inward when the handle 42 is in the stored position and faces outward when the handle 42 is in the use position.

The film winder 38 is coaxial with and, preferably, adjoins and at east partially encircles the crank 36. The film winder 38 has a grip portion 50 which is configured as a thumb-wheel or advance lever or the like. In the embodiment shown in the figures, the film winder 38 has a ring portion 53 that is continuous with the grip portion 50. The ring portion 53 encircles the cap portion 45 of the crank and overlies the gear portion 41. The ring portion 53 can be configured to receive clips 57 or other attachment features of a holder 59 that overlies at least a part of the ring portion 53. The holder 59 engages a feature (not separately indicated) of the crank 36 and retains the film winder 38 and crank 36 together.

The crank 36 and film winder 38 each define a common winding axis 44 and are each rotatable about the winding axis 44 in opposed first and second directions of rotation (indicated by arrows 46,48 in FIGS. 1 and 5) relative to the body 12 or other fixed point. The movement of the film winder 38 is generally described herein as "pivoting". The movement of the crank is generally described herein as "rotation". It will be understood that each of these terms are inclusive of pivotal or rotary motion through a full circle. The term "pivoting" is also inclusive of pivotal or rotary motion through less than a full circle. The film winder 38 can be limited to pivoting through an arc of less than a full circle. For example, the film winder 38 shown in FIG. 1, has a grip portion 50 that is an advance lever mounted for rotation through a limited arc about (180–240 degrees). The film winder 38 can also be configured for rotation through a complete circle. For example, the film winder 38 shown in FIGS. 10–11, has a grip portion 50 that is a thumbwheel and is rotatable through 360 degrees. Despite being continuously rotatable, the thumbwheel is most conveniently used by the operator stroking the wheel with a thumb. The thumbwheel is heavily knurled to prevent slippage of the operator's thumb.

The advance-rewind 14 has a one-way, overrunning clutch 52 between the crank 36 and the film winder 38. The clutch 52 is selectively switchable between active and released states. When the clutch 52 is in the active state and the film winder 38 is rotated in the first direction, the film winder 38 is coupled to the crank 36 and both rotate. When the clutch 52 is in the active state and the crank 36 is rotated in the first direction, the film winder 38 is decoupled from the crank 36 and only the crank 36 rotates. Rotation of the crank 36 in the second direction is precluded when the clutch 52 is in the active state. Thus when the clutch 52 is in the active state, film can be advanced by winding the crank 36 or ratcheting the film winder 38 or by some combination of the two, but film cannot be rewound. In the released state, the clutch 52 permits rotation of said crank 36 relative to the body 12 in the second direction of rotation. The film winder 38 is preferably decoupled from the crank 36 either when the clutch 52 enters the released state or after rotation of the film winder 38 to a rest position.

The clutch 52 has a switch member 54 disposed in operative relation to the crank 36 and film winder 38 that switches the clutch 52 between the active and released states. The clutch 52 preferably includes a resilient member or spring 56 that biases the switch member 54 to a first position, in which the clutch 52 is in the active state. The switch member 54 is movable to a second position to change the clutch 52 to the released state. The switch member 54 can be directly or indirectly actuable by the operator to change the state of the clutch 52. The switch member 54 can also instead automatically change the clutch 52 to the released state each time one of the winding elements 36,38 assumes a rest position. In this case, a anti-backup or the like is necessary to prevent inadvertent rewinding.

In currently preferred embodiments of the invention, the clutch 52 includes a ratchet or ratchet gear 58 and a pawl 60. The ratchet gear 58 is joined in fixed relation to one of winding elements 36 or 38. The pawl 60 is joined to the other winding element 38 or 36. The ratchet gear 58 has teeth 62 and the pawl 60 is biased toward the teeth 62. The switch member 54 is actuable to prevent the pawl 60 from engaging the teeth 62. In the embodiment in the figures, the ratchet gear is continuous with the cap portion 45 of the crank 36 and pawl 60 is pivotably mounted to the film winder 38 and is biased by a spring 56 toward the teeth 62 of the ratchet gear 58, which is part of the base 40 of the crank 36. The spring 56 bears against the pawl 60 and a pin 64 (not shown in all the figures). The pin 64 is fixed to the rim 66 of the winning element 38.

Figure 7:
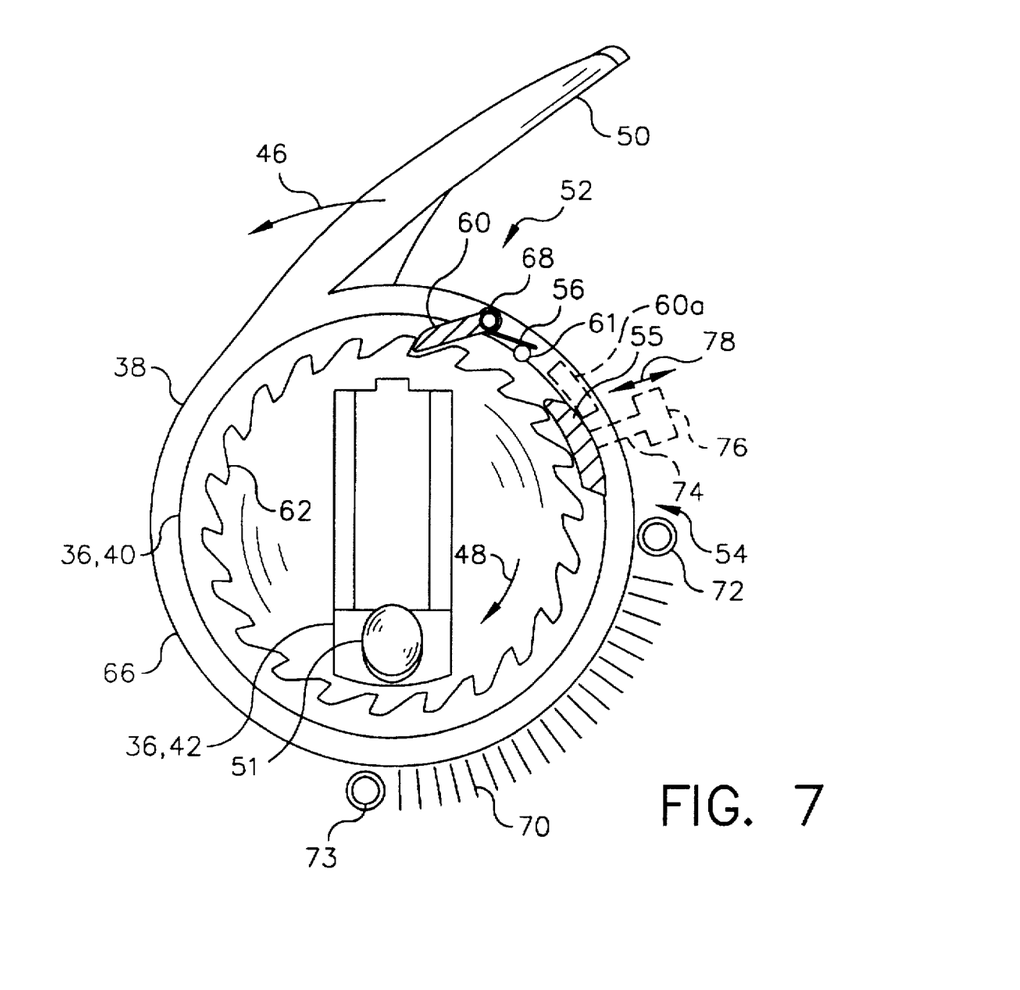
FIG. 7 is a cross-sectional view of the advance-rewind unit of FIG. 6, taken substantially along line 7—7.

In these embodiments, the switch member includes a ramp 55. The ramp 55 can be permanently fixed to the rim 66 of the film winder 38 in a position extending into the path of the pawl 60 during pivoting. In this case, every time the film winder 38 pivots to a rest position, the pawl 60 engages the ramp 54 and is pivoted about pin 68 away from the teeth 62 of the ratchet gear 58. The rest position is a relative angular relation of the first and second winding elements 36,38 in which the pawl (indicated in FIG. 7 by dashed line 60a) is pushed outward. In use, film is advanced by an operator rotating the crank 36 or film winder 38 and crank 36 in the first direction of rotation. At the completion of film exposure, the operator places the film winder 38 in the rest position to switch the clutch 52 into the rewind state and deactivates a separate anti-backup (not illustrated). Film can then be rewound by rotating the crank 36 in the second direction of rotation. A resilient member 56, such as a coil spring 70, can be attached to posts 72,73 on the winding elements 36,38 to bias the film winder 38 toward the rest position. Post 72 is mounted to a flange 74 that extends radially outward from the ring portion 53 of the film winder 38. Post 73 is fixed to the body 12.

The switch member 54 can also be mounted for radial movement relative to the crank 36. For example, the switch member 54 can include a ramp 55, a shaft 74 which extends through a hole in the rim 66 of the film winder 38, and a button 76 fixed to the shaft 74 opposite the ramp 55. The shaft 74 can be slidably movable in the hole, in the directions indicated by double-headed arrow 78, between a use position (shown in FIG. 7) and a non-use position (not illustrated) outboard from the use position and the path of the pawl 60 during pivoting. The switch member 54 can be biased outward into the non-use position, by a compression spring (not illustrated). With this switch member 54, the pawl 60 engages the ramp 55 and is pivoted about a pin 68 away from the teeth 62 of the ratchet gear 58 only when the ramp 55 is pushed inward into the use position. This can be done directly by the operator or can be accomplished indirectly through motion of another part (not shown). This switch member 54 can take the place of a separate anti-backup or can be configured to operate in tandem with a separate anti-backup. Film is advanced by the operator rotating the crank 36 or film winder 38 and crank 36 in the first direction of rotation. At the completion of film exposure the operator holds the switch member 54 in place to overcome the biasing of the resilient member 56 and change the clutch 52 into the rewind state. Film can then be rewound by rotating the crank 36 in the second direction of rotation.

Figure 6:
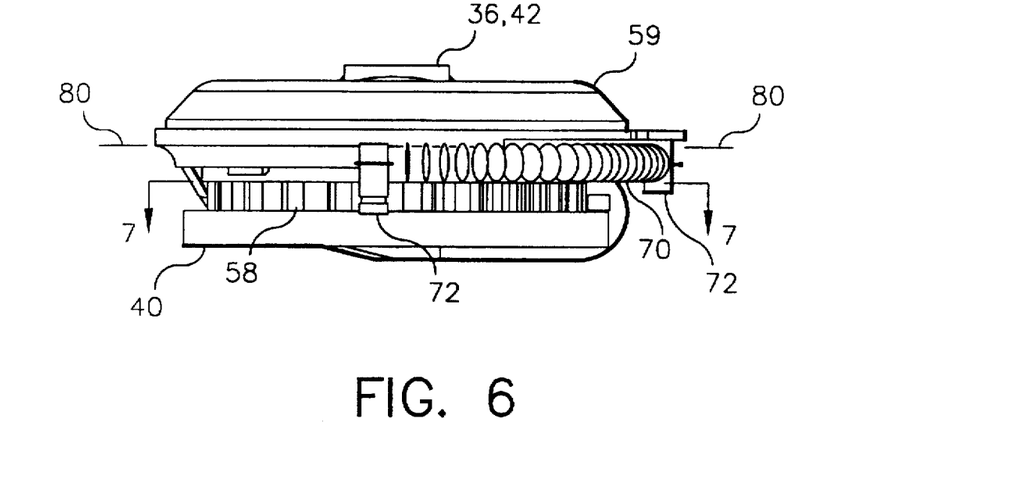
FIG. 6 is a side plan view of the advance-rewind unit of FIG. 1.

The advance-rewind 14 of the invention has the advantage that it can be very compact in a direction parallel to the winding axis 44. In a particular embodiment the film winder 38 adjoins and at least partially encircles the crank 36. The crank 36, film winder 38, and clutch 52 are aligned along the winding axis 44 such that at least one geometric plane (indicated in FIG. 6 by item 80) perpendicular to the winding axis 44 extends through the crank 36, the film winder 38 and the clutch 52. Referring again particularly to FIG. 6, the crank 36 has a handle 42 that is folded into the base 40 such that the winding elements 36,38 have about the same dimension in a direction parallel to the axis of rotation, when the handle 42 is in the stored position.

The compact dimension of the advance-rewind 14 in a direction parallel to the winding axis 44 allows placement of the advance-rewind 14 in locations on the camera 10 in which the winding axis 44 is not coextensive with one of the film space axes 26. The advance-rewind 14 can be positioned such that the winding axis 44 is noncollinear with either of the film space axes 26 along an imaginary plane 81 defined by said film space axes 26 (see FIG. 9), or can be offset from that plane, slightly or so far that the winding axis 44 is exterior to the film chambers 16,18. The latter is shown in FIG. 8, in which the advance-rewind 14 is positioned at a corner of the camera 10. A gear train or other film drive 30 can be included to also shift the winding axis 44 ninety degrees to the film space axes, as shown in FIGS. 10–11.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

PARTS LIST camera 10
body 12
advance-rewind 14
first film chamber or cartridge chamber 16
cartridge 17
second film chamber or supply chamber 18
spline 19
exposure frame 20
cartridge 21
film path 22
film plane 23
film space 24
film space axis 26
film exposure system 28
film drive 30
gears 31
engagement element 32
gear train 33
metering mechanism 34
first winding element or crank 36
second winding element or film winder 38
base or gear unit 40
gear portion 41
handle 42
winding axis 44
cap portion 45
arrow (indicates first direction of rotation) 46
socket 47
arrow (indicates second direction of rotation) 48
grip portion 50
knob 51
clutch 52
ring portion 53
switch member 54
ramp 55
resilient member 56
clips 57
ratchet or ratchet gear 58
pawl 60
teeth 62
pin 64
rim 66
pin 68
coil spring 70
posts 72,73
shaft 74
button 76
double-headed arrow 78
plane 80

What is claimed is:

1. A camera for use with photographic film, said camera comprising:
    a body enclosing a film path;
    a film drive disposed in said body in operative relation to said film path;
    a crank engaging said film drive, said crank having a base and a handle, said crank defining a winding axis, said crank being rotatable about said winding axis in opposed first and second directions of rotation relative to said body;
    a film winder coaxial with said crank, said film winder having a grip portion, said film winder being pivotable about said winding axis in said first and second directions; and
    a one-way, overrunning clutch disposed between said crank and said film winder, said clutch being switchable between active and released states, said clutch, in said active state, coupling said film winder to said crank during rotation of said film winder relative to said body in said first direction of rotation, decoupling said film winder from said crank during rotation of said crank relative to said film winder and said body in said first direction of rotation, and precluding rotation of said crank relative to said body in said second direction of rotation, said clutch, in said released state, permitting rotation of said crank relative to said body in said second direction of rotation.

2. The camera of claim 1 wherein said film winder adjoins said crank.

3. The camera of claim 1 further comprising a switch member disposed in operative relation to said clutch to switch said clutch from one of said states to the other said state.

4. The camera of claim 3 further comprising a resilient member biasing said clutch to one of said states.

5. The camera of claim 1 wherein said crank, film winder, and clutch are aligned along said winding axis such that at least one geometric plane perpendicular to said winding axis extends through said crank, said film winder and said clutch.

6. The camera of claim 1 wherein said film winder at least partially encircles said crank.

7. The camera of claim 1 wherein said film is advanced by rotation of said crank or pivoting of said film winder in said first direction and said film is rewound by rotation of said crank in said second direction.

8. A camera for use with photographic film, said camera comprising:
- a body having a pair of film chambers and an exposure frame disposed between said chambers, said body defining a film path including a film plane aligned with said exposure frame and a film space within each of said chambers, said film spaces each having an axis aligned parallel to said film plane;
- a film drive disposed in said body in operative relation to said film path;
- a first winding element meshed with said film drive, said first winding element being at least partially accessible from outside said body;
- a second winding element disposed coaxial with said first winding element, said second winding element being at least partially accessible from outside said body; and
- a clutch disposed between said first winding element and said second winding element, said clutch being selectively switchable between active and released states, said clutch, in said active state, coupling said second winding element to said first winding element during rotation of said second winding element relative to said body in said first direction of rotation, decoupling said second winding element from said first winding element during rotation of said first winding element relative to said second winding element and said body in said first direction of rotation, and precluding rotation of said first winding element relative to said body in said second direction of rotation, said clutch, in said released state, permitting rotation of said first winding element relative to said body in said second direction of rotation;
- said second winding element and said first winding element having a common axis of rotation noncollinear with either of said film space axes.

9. The camera of claim 8 wherein said axis of rotation of said winding elements is parallel to an imaginary plane defined by said film space axes.

10. The camera of claim 9 wherein said axis of rotation of said winding elements is offset from said imaginary plane defined by said film space axes.

11. The camera of claim 8 wherein said axis of rotation of said winding elements is perpendicular to said film axes.

12. The camera of claim 8 wherein said axis of rotation of said winding elements is exterior to said film chambers.

13. The camera of claim 8 wherein said first winding element has a handle and a gear unit, said handle being pivotable relative to said gear unit between a use position wherein said handle extends outward from said gear unit and a stored position wherein said handle is at least partially recessed within said gear unit.

14. The camera of claim 8 wherein, when said handle is in said stored position, said winding elements have about the same dimension in a direction parallel to said axis of rotation.

15. The camera of claim 8 wherein said clutch includes a ratchet gear and a pawl, said ratchet gear being joined in fixed relation to one of said winding elements, said pawl being joined to the other of said winding elements, said ratchet gear having teeth, said pawl being biased toward said teeth.

16. The camera of claim 15 wherein said second winding element includes said pawl and said pawl is pivotably mounted to said second winding element and biased toward said ratchet gear.

17. The camera of claim 16 further comprising a ramp joined in fixed relation to said second winding element, said ramp pivoting said pawl away from said ratchet gear at a first relative rotation of said second winding element and said first winding element, and a resilient member biasing said second winding element in said first direction of rotation toward said ramp.

18. The camera of claim 8 wherein said film spaces are cylindrical.

19. An advance-rewind unit usable with a film drive in a camera body to wind and rewind photographic film, said advance-rewind unit comprising:
- a crank engagable with said film drive, said crank having a base and a handle, said crank defining a winding axis, said crank being rotatable about said winding axis in opposed first and second directions;
- a film winder coaxial with said crank, said film winder having a grip portion, said film winder being pivotable about said winding axis in said first and second directions; and
- a one-way, overrunning clutch disposed between said crank and said film winder, said clutch being switchable between active and released states, said clutch, in said active state, coupling said film winder to said crank during rotation of said film winder in said first direction, decoupling said film winder from said crank during rotation of said crank relative to said film winder in said first direction, and precluding rotation of said crank relative to said body in said second direction, said clutch, in said released state, permitting rotation of said crank in said second direction;
- whereby said film is advanced by rotation of said crank or pivoting of said film winder in said first direction and said film is rewound by rotation of said crank in said second direction.

20. The camera of claim 19 wherein said film winder at least partially encircles said crank and said crank has a handle and a gear unit, said handle being pivotable relative to said gear unit between a use position wherein said handle extends outward from said gear unit and a stored position wherein said handle is at least partially recessed within said gear unit.

* * * * *